United States Patent [19]

Paysinger

[11] 4,343,207
[45] Aug. 10, 1982

[54] TOOL FOR SPIRAL MACHINING

[75] Inventor: Joseph R. Paysinger, Houston, Tex.

[73] Assignee: Crutcher Corporation, Houston, Tex.

[21] Appl. No.: 118,336

[22] Filed: Feb. 4, 1980

[51] Int. Cl.³ .............................................. B23B 3/26
[52] U.S. Cl. ...................................... 82/4 R; 82/4 C
[58] Field of Search .............................. 82/4 C, 4 R

[56] References Cited

U.S. PATENT DOCUMENTS

| | | | |
|---|---|---|---|
| 2,554,207 | 5/1951 | Pegard | 82/2 E |
| 2,831,386 | 4/1958 | Woytych | 82/2 E |
| 3,115,055 | 12/1963 | Sepulveda | 82/4 C |
| 3,181,398 | 5/1965 | Rogers | 82/4 C |
| 3,222,960 | 12/1965 | Gill | 82/4 C |
| 3,772,944 | 11/1973 | Becker et al. | 82/4 C |
| 4,186,630 | 2/1980 | Lindhag | 82/4 R |

FOREIGN PATENT DOCUMENTS

| | | | |
|---|---|---|---|
| 132931 | 11/1978 | Fed. Rep. of Germany | 82/4 R |
| 1526786 | 9/1978 | United Kingdom | 82/4 C |

Primary Examiner—Leonidas Vlachos
Attorney, Agent, or Firm—Michael P. Breston

[57] ABSTRACT

The tool is especially adapted for field use for spiral machining annular and solid work members of any geometric configuration, including but not limited to pipes, valves, flanges, etc., and comprises a stand carrying a hollow main shaft which rotatably supports a face plate which, in use, is positioned opposite to the work member. A tool holder is mounted for radial travel on the face plate. A motor rotates the face plate. The rotary motion of the face plate causes the tool holder to rotate and linearly travel. Preferably, the tool holder is mounted on a frame disposed for adjustable pivotal movement relative to the face plate.

7 Claims, 20 Drawing Figures

TOOL FOR SPIRAL MACHINING

BACKGROUND OF THE INVENTION (a) Field of the Invention

This invention relates to tools for machining in the field surfaces of work members having greatly varied configurations.

(b) Description of the Prior Art

Machines for machining in the field the ends of annular members, such as large pipes, flanges, and the like, are already known. One such machine of which I am a co-inventor, is described in U.S. Pat. Nos. 3,680,406 and 3,733,939. Another such machine is described in U.S. Pat. No. 3,875,832. The known machines have certain drawbacks: they are primarily adapted for use on annular members, pipes, valves, etc.; they require relatively large power for their operation; they require especially formed cutting tools which are expensive to make and which have a relatively short operational life; each such machine is limited in operation to a relatively small range of annular members, thus requiring the hauling into the field of smaller and larger machines; and they do not lend themselves to making continuous spiral grooves, such as are frequently required for gasket sealing preparations.

It is the main object of the present invention to overcome the above and other known drawbacks of the prior art machines.

It is an object of the present invention to provide a tool capable of making continuous, spiral machining operations on work members which can be hollow or solid and which can have a wide range of sizes and shapes.

It is another object of the invention to provide such a tool for spiral machining with conventional and, therefore, readily available and relatively inexpensive cutting tools.

It is a further object of the invention to provide such a tool adapted for bevel and spiral groove forming utilizing ordinary cutting tools.

It is yet another object to provide such a spiral machining tool, which is relatively inexpensive to manufacture, relatively easy to operate by field personnel, and which can be powered with a relatively small size motor.

SUMMARY OF THE INVENTION

The novel tool of this invention includes a base carrying a hollow main shaft on which is rotatably mounted a face plate. A clamp securely clamps to the shaft a work member requiring a machining operation. A tool holder is mounted on the face plate for linear travel in a radial direction relative to the center of the hollow shaft. This linear movement of the tool holder is obtained from the rotary motion of the face plate. In a preferred embodiment, the tool holder is mounted on a frame that can pivot about the axis of a shaft which is driven in a planetary manner by the face plate. The rotation of this shaft is translated into the linear movement of the tool holder. The tool holder is adapted to use relatively inexpensive, conventional machining tools which can move across the face of a work member in a continuous, spiral pattern.

DESCRIPTION OF A PREFERRED EMBODIMENT

General Description

With reference to FIGS. 1-14, the machine of this invention, generally designated as 10, comprises a rigid stand or base 9 having an upright frame 9a in which are provided holes 9b for the purpose of attaching a rope 9c (FIG. 19), as when required to move the tool by a crane, etc. Tool 10 is powered by a single motor 8 mounted on the upright 9a with its shaft 57 extending in the horizontal direction.

A horizontal, hollow, main support shaft 7 is fixedly mounted to the upright 9a by a cylindrical collar 78. A platform 31, having a face plate 33 on one side and a pulley 60 on its opposite side, is rotatably mounted about shaft 7. A traveling tool holder 49, which accepts a tool 50, is mounted on the face plate 33. Holder 49 is driven by a transmission drive mechanism 45 (FIGS. 9-13), which causes tool 50 to move to move in a radial direction relative to the center of face plate 33. Transmission 45 is driven by a shaft 41 through a clutch 53. The axis of shaft 41 is substantially parallel to the face plate 33 and is perpendicular to the axis of a planetary drive shaft 71 which is rotatably mounted in a bushing 70. Bushing 70 is fixed to platform 31 and extends therethrough in a horizontal direction parallel to shaft 7.

Figures 9, 10, 11, 12, 13:
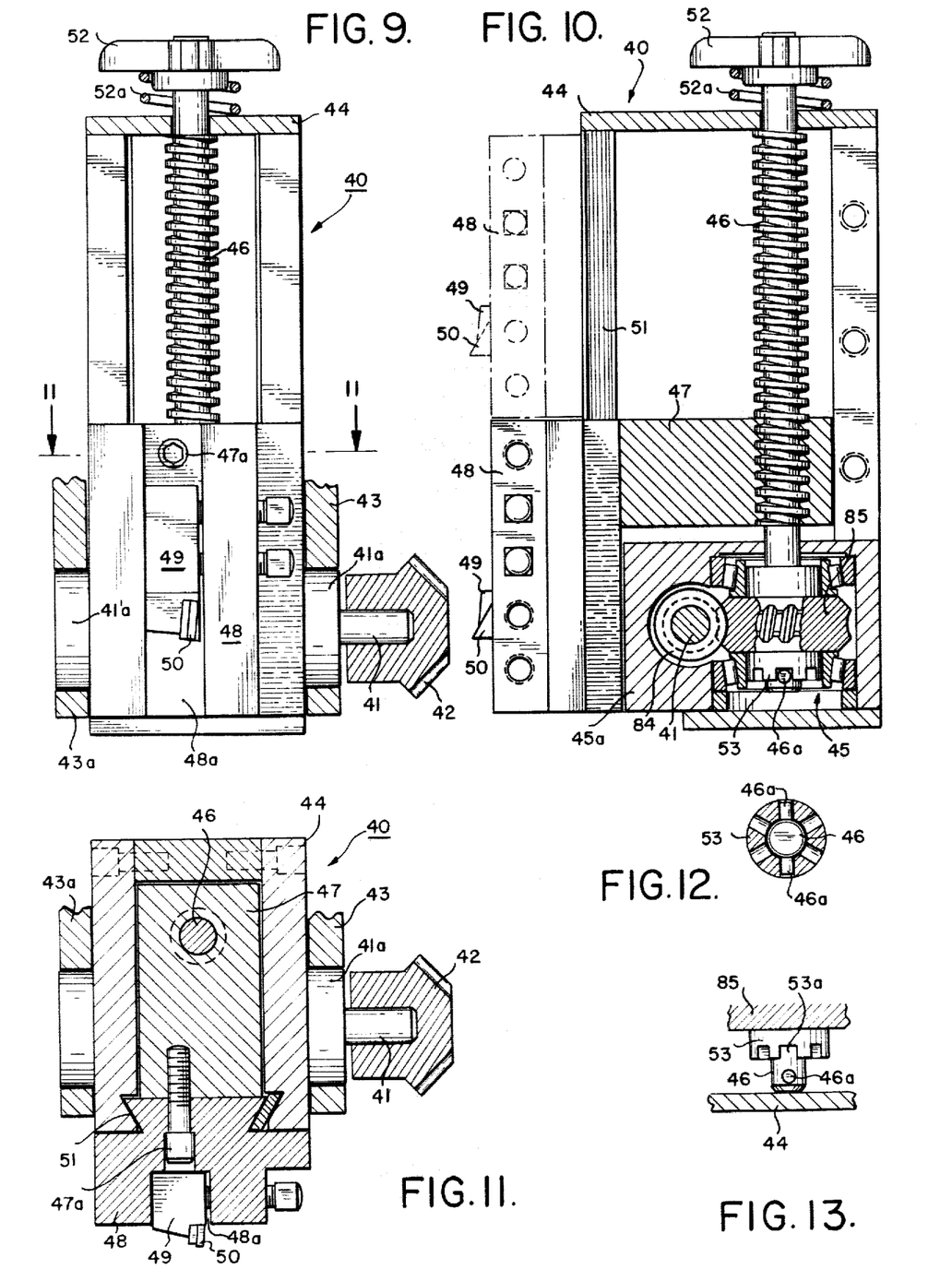
FIG. 9 is a front view, with certain parts broken away and/or in section, of the tool frame.
FIG. 10 is a side, sectional view, of the tool frame of FIG. 9, showing the transmission drive mechanism for driving the tool holder.
FIG. 11 is a sectional view taken on line 11—11 of FIG. 9.
FIG. 12 is a front view of the clutch plate, in its engaged position, used in the gear train shown in FIG. 10.
FIG. 13 is a side view of the clutch plate of FIG. 12 in its disengaged position.
Figure 14:
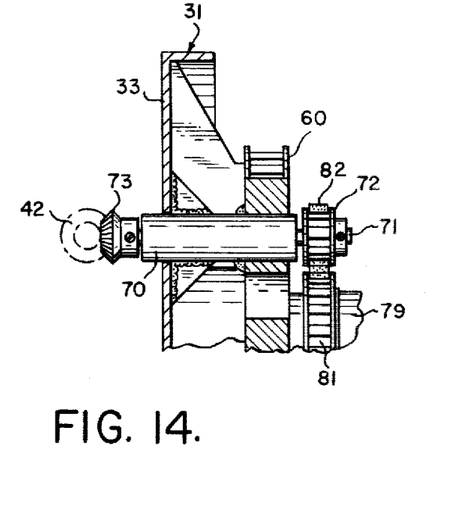
FIG. 14 is a detail, sectional view of the planetary drive coupling the rotation of the face plate to the gear train shown in FIG. 10.
Figure 15:
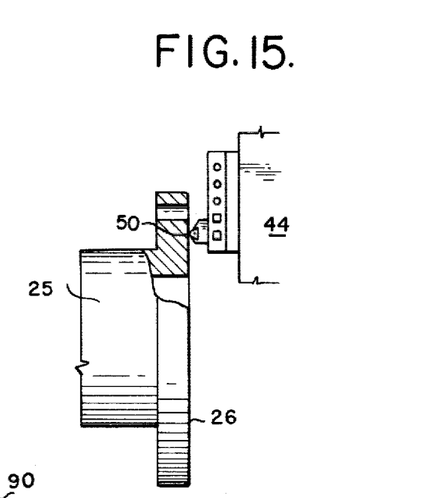
FIG. 15 is a side view of the tool holder in position to start cutting a spiral groove on a flange face.

Tool holder 49 rotates with platform 31 and can travel at the same time linearly and in a radial direction relative to the axis of main shaft 7. The only external source of power required is motor 8 whose shaft 57 rotates pulley 60. The face plate 33 and the tool holder 49 rotate with pulley 60. The linear travel of tool holder 49 is derived indirectly from a planetary drive mechanism which can rotate shaft 71 through a clutching mechanism 76. Shafts 41 and 71 are geared through bevel gears 42 and 73, respectively. The rotation of shaft 41 is converted into the linear travel of tool holder 49 by the transmission drive mechanism 45 (FIG. 10).

A work member 25 is securely held by a clamp 12 which is attached to a clamp rod 11 that is coaxially mounted within main shaft 7. Rod 11 can be manually rotated to radially expand or contract clamp 12. The clamp is also attached to a work control sleeve 61 (FIG. 7) which is concentrically mounted between rod 11 and main shaft 7. Sleeve 61 can move in a longitudinal direction to bring the work member 25 towards or away from the face plate 33.

After the clamp 12 is securely fastened to the work member 25 and the work member is positioned opposite to the face plate 33, the tool holder 49 is manually moved so that its tool 50 is disposed at the desired distance relative to work member 25. Then, when motor 8 is energized, tool 50 will travel in a spiral path (FIG. 16) across the surface 26 of the work member 25.

As a further advantage of the invention, the tool holder 49 is mounted on a tool frame 40 which is pivotally mounted on a bracket that is securely fastened to face plate 33. Frame 40 can be adjusted to any desired angular position relative to face plate 33.

The adjustability of the tool holder 49 in a radial direction, in a plane perpendicular to the longitudinal axis of main shaft 7, and in an angular direction relative to such plane, allows the operator of tool 10 great flexibility in use and the ability to employ conventional cutting tools which are generally available at economical prices.

Detailed Description (a) Clamping Device 12 and Feed Control Sleeve 61.

Clamping device 12 (FIG. 1) is adapted for use with annular-type work members 25, such as pipes, valves, etc. The particular work member illustrated is a valve body 25' having a longitudinal bore therethrough. Clamping device 12 is of the expandable type adapted to grip the wall of the bore. Clamp 12 is mounted on the clamp rod 11 (FIGS. 1, 7, 8) whose inner end is coupled to a crank 62 and its outer end has oppositely-threaded portions, spaced 17, 17' which threadedly engage a pair of discs 13, 14, respectively. A center bushing 16 is disposed between discs 13 and 14 and carries thereon a guide disc 15. Discs 13, 14 and 15 having longitudinal slots 13', 14', 15', respectively, which are angularly-spaced apart on the outer peripheries of the discs. Each set of axially-aligned slots 13'-15' supports a blade 19 having on its inner sides tapered walls 20 and on its outer sides gripping jaws 21.

In addition to being threadedly coupled to shaft 11, clamp 12 is also detachably secured to flange 12b of movable sleeve shaft 61. This can be accomplished by detachably securing disc 14 to shaft 61. To protect the bores of hollow shafts 7 and 61 from collecting metal cuttings, there is also provided a shield sleeve 12a which is slidably mounted on a seal 12a' (FIG. 7) supported by the outer end 7b of hollow shaft 7. Disc 14 can be conveniently detachably secured to both shaft 61 and to flange 12b of the shield sleeve 12a.

Sleeve 61 is disposed inside main shaft 7 for axial movement but not rotation relative to clamp rod 11. The inner end of sleeve 61 has an external thread 61a and a stop shoulder 61d. A feed control sleeve 64 has an internal thread 64a to threadedly engage the external thread 61a. Feed control sleeve 64 has an annular groove 64b for accepting therethrough a threaded pin 78a which extends through collar 78 and prevents the axial movement of sleeve 64 when it is rotated by its handle bars 63.

The maximum axial displacement of sleeve 61 to the left (as viewed in FIG. 7) is limited by a threaded pin 61c riding in a longitudinal groove 61b. When sleeve 61 reaches such maximum displacement, pin 61c will abut against shoulder 61d. The axial displacement of sleeve 61 to the right is determined by the stop wall 64d of sleeve 64.

Figure 1:
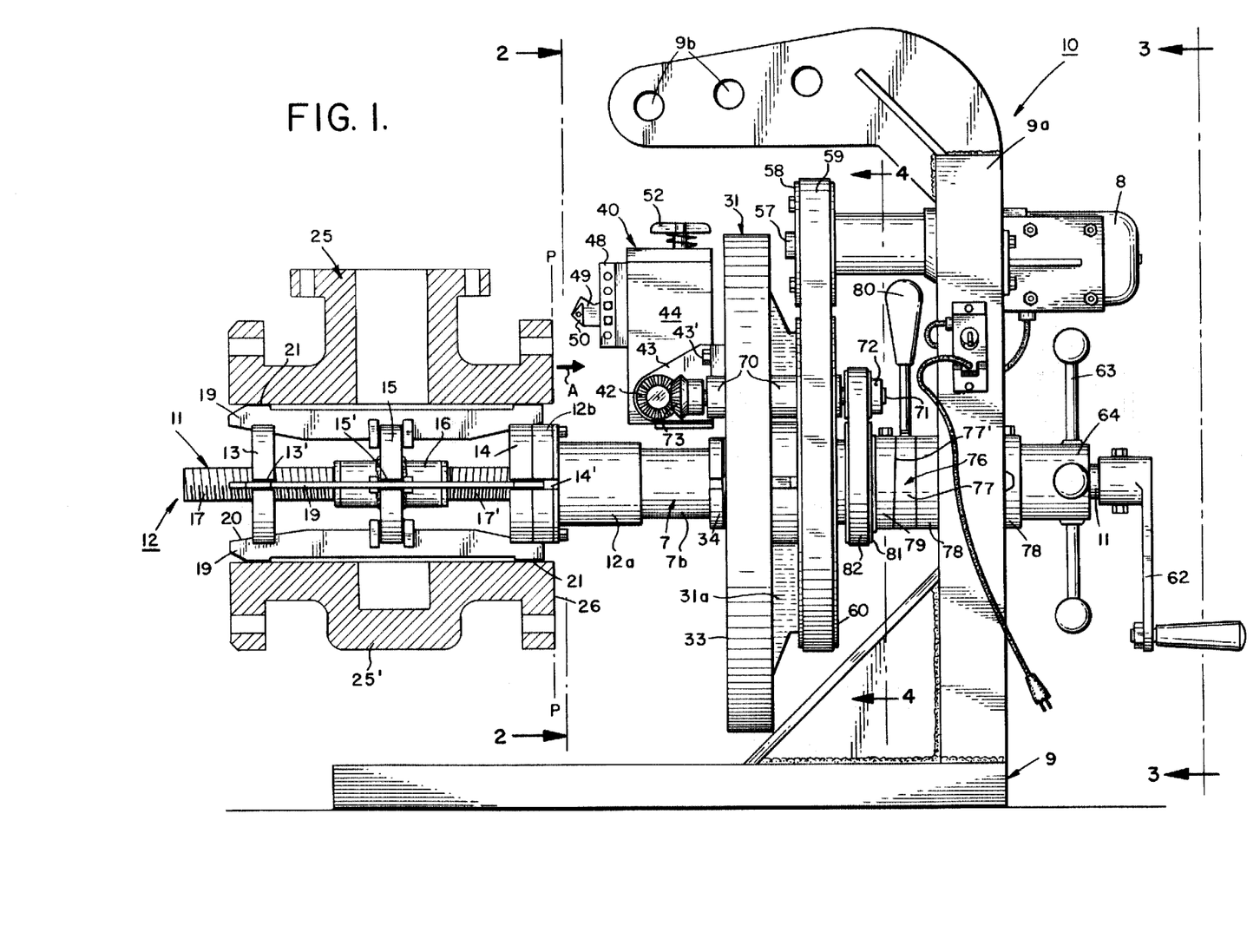
FIG. 1 is a side elevational view, with certain parts broken away and or in section, of a preferred embodiment of the tool of this invention.
Figure 2:
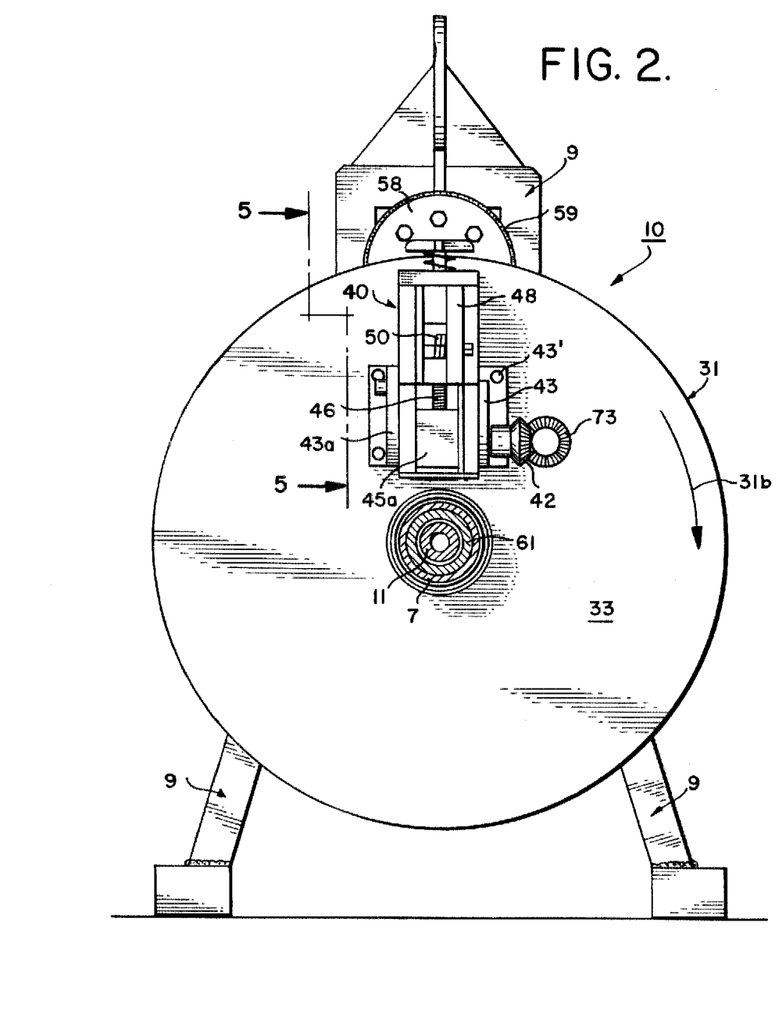
FIGS. 2, 3, 4 are views taken along lines 2—2, 3—3, and 4—4, respectively, of FIG. 1.
Figure 3:
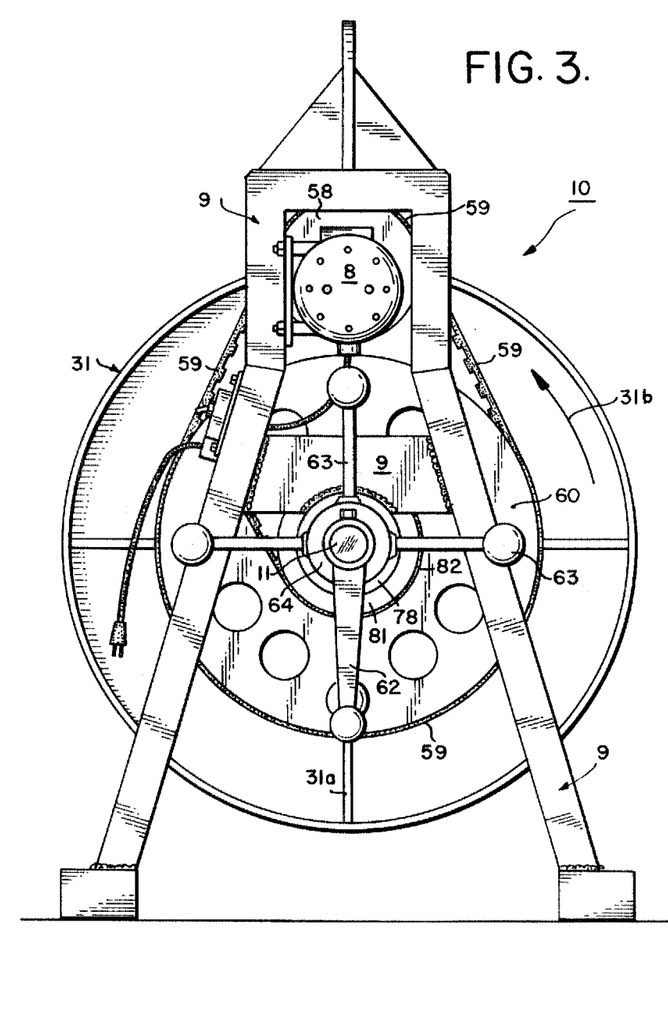
Figure 4:
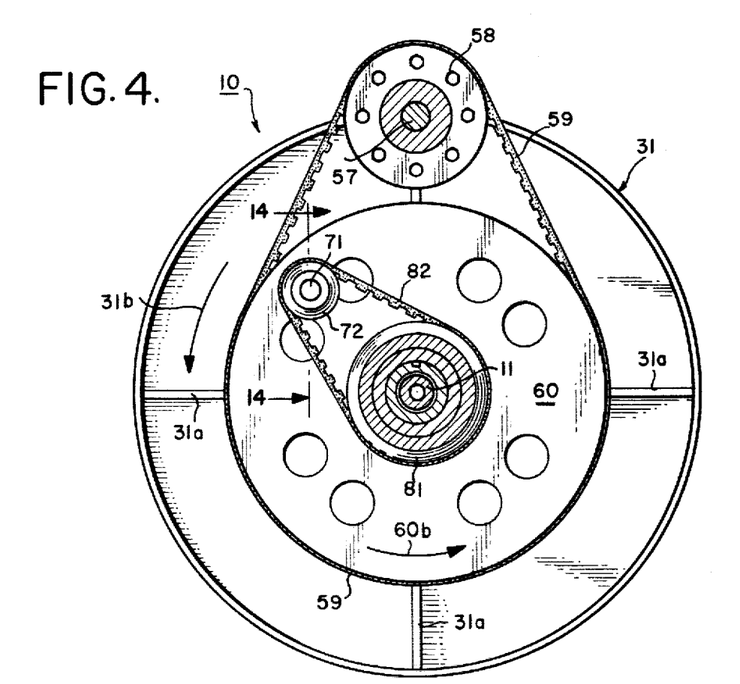

Thus, the rotation of rod 11 will secure or detach the clamp 12 to or from the main shaft 7, while the rotation of feed control sleeve 64 will cause sleeve 61 to move axially to bring the work member 25 toward or away from the face plate 33. In FIG. 1, the work member is a valve body 25' having a flange whose surface 26 it is desired to machine in a plane P-P which is parallel to the face plate 33.

(b) Platform 31.

Platform 31 has on one side the pulley 60 and on the opposite side the face plate 33 and comprises reinforcing gussets 31a. Platform 31 is rotatably mounted on roller bearings 32 held in place by a retainer 34. The hollow bushing 70 extends through and is fixedly secured to the platform 31. The planetary drive shaft 71 is rotatably mounted in and extends through bushing 70.

(c) Pivotable Tool Frame 40.

Figure 5:
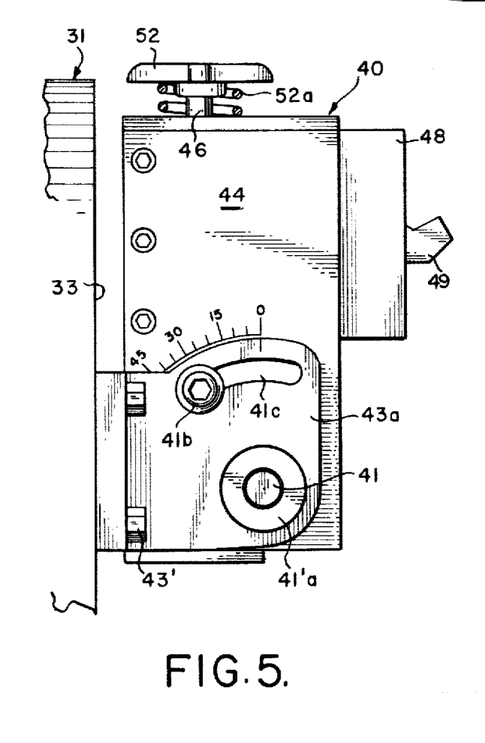
FIG. 5 is a side view of the tool frame shown mounted parallel to the face plate.
Figure 6:
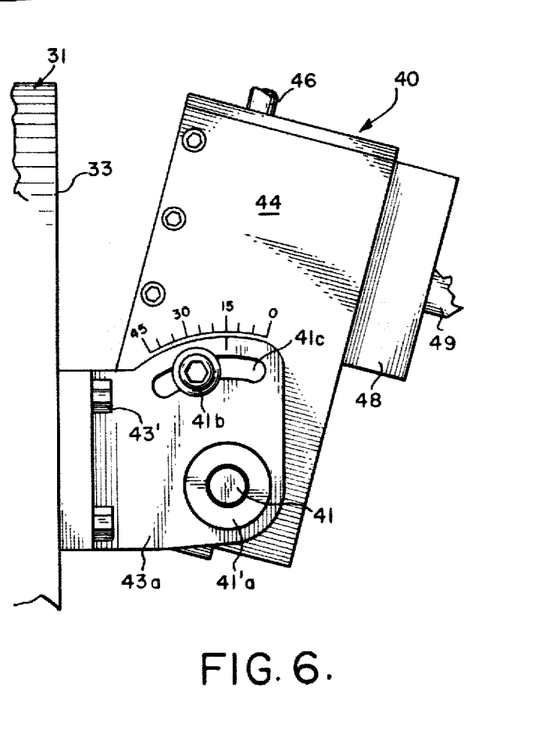
FIG. 6 is similar to FIG. 5 with the tool frame shown pivoted relative to the face plate.

Pivotable tool frame 40 has a housing 44 and is pivotably mounted in brackets 43, 43a which support hubs 41a, 41'a, respectively (FIGS. 9, 10). Shaft 41 extends through and is rotatably mounted in the hubs 41a, 41'a. The brackets 43, 43a are secured to face plate 31 by bolts 43' (FIG. 5). Bracket 43a has an arcuate slot 41c in which rides an adjusting bolt 41b that can securely fasten frame 40 to bracket 43a, at any desired angular position of tool holder 49 relative to face plate 33.

(d) Transmission Drive Mechanism 45.

The rotation of shaft 41 (FIGS. 9-13) is transmitted into linear travel of tool holder 49 by the transmission drive mechanism 45. Bevel gear 73 (FIG. 1) drives bevel gear 42 and hence rotates shaft 41. Inside housing 44 is a transmission box 45a in which is mounted a worm gear 84 carried by shaft 41. Gear 84 meshes with a rotatably mounted pinion gear 85 carrying at the lower end thereof an annular clutch plate 53 having radial recesses 53a therein. Extending vertically through the center of pinion gear 85 is the unthreaded, bottom portion of a lead screw 46 carrying a transverse pin 46a for selective engagement with the recesses 53a in clutch plate 53.

Lead screw 46 extends through the upper wall of housing 44 and has a coil spring 52a thereabout under a hand wheel 52. By compressing spring 52a with wheel 52, the lower end of the lead screw 46 will move downwardly, allowing pin 46a to disengage from clutch plate 53, thereby decoupling the lead screw 46 from the rotation of pinion gear 85. Thus, when clutch 53 is disengaged from the lead screw 46, tool holder 49 will not travel on the lead screw as a result of the rotation of shaft 41.

Lead screw 46 is threadedly engaged to a traveling nut 47 to which is attached by screws 47a a slide block 48. A dovetail slide 51 is formed by the end portions of a pair of opposite side walls of housing 44. Block 48 slides in the dovetail 51 and has on the front face thereof a recess 48a for detachably receiving the tool holder 49 adapted to carry conventional cutting tools 50 having configurations dependent on the desired machining operations to be performed by tool 10 on the work member 25.

When pin 46a is disengaged from clutch 53 by the exertion of a downward force on the wheel 52, the lead screw 46 can be hand rotated which will cause tool holder 49 to bring its tool 50 to a desired start position opposite to the work member 25.

If desired, before applying power to tool 10, frame 40 is pivoted on the brackets 43, 43a and secured to any desired angular position relative to the face plate 33.

(e) The Power Train for Tool 10.

Motor 8 is shown as being electrically operated, although it could be operated by air or fluid. The shaft 57 of motor 8 (FIG. 1) carries a pulley 58 whose rotation is transmitted by a belt 59 to pulley 60 which rotates platform 31. A pulley 81 is mounted on a sleeve bearing 82' between a pair of bearing plates 82a for rotation about main shaft 7. Pulley 81 can be locked to shaft 7 (FIG. 1, 7) through the clutch arrangement 76 which comprises a rotatable wedge ring 77 and an adjacent wedge ring 79. Rings 77, 79 are mounted on main shaft 7 and have opposite wedge faces 77'. A pin 79a secures ring 79 against rotation relative to shaft 7 by projecting into a recess 7a whose axial length limits the axial displacement of ring 79. Ring 77 is sandwiched between ring 79 and the end wall of collar 78. Ring 77 can be rotated with a handle 80 to exert an axial force to the left (as viewed in FIG. 7) against the sloping face 77' of ring 79, thereby locking pulley 81 to stationary shaft 7. Thus, when the clutching device 76 is engaged, pulley 81 remains stationary with and locked to shaft 7.

(f) Operation.

In operation, tool 10 is clamped to the desired work member 25 with the aid of the clamping device 12. Rotation of crank 62 will rotate rod 11 which will cause threaded discs 13 and 14 to move towards each other, thereby expanding clamp 12 and causing jaws 21 to firmly grip work member 25.

After clamp 12 is securely fastened to work member 25, feed control sleeve 64 is rotated to cause sleeve 61 to move axially to the right (as viewed in FIG. 1) thereby moving work member 25 in the direction of the arrow A toward and opposite to face plate 33.

The tool frame 40 is then pivotably adjusted to the desired angular inclination relative to face plate 33. For most required machining operation, frame 40 will be parallel with the face plate 33. To make bevel cuts, however, it is advantageous to incline frame 40 dependent on the bevel angle to be machined. Wheel 52 (FIG. 5) is then depressed to disengage the clutch 53 from the lead screw 46 and hence from the pinion gear 85. While wheel 52 is pressed downwardly, it is also rotated to cause tool holder 49 to travel to a position dictated by the start position for tool 50 on the face 26 of the work member 25.

After these preliminary adjustments have been made, tool 8 is ready to become energized by motor 10.

When the shaft 57 of motor 8 starts rotating, its pulley 58 causes the rotation of pulley 60 and face plate 33. As viewed in FIG. 2, platform 31 rotates clockwise, and as viewed from its opposite side (FIG. 3) platform 31 rotates counterclockwise. The directions of rotation are indicated by the arrows 31b.

Figure 7:
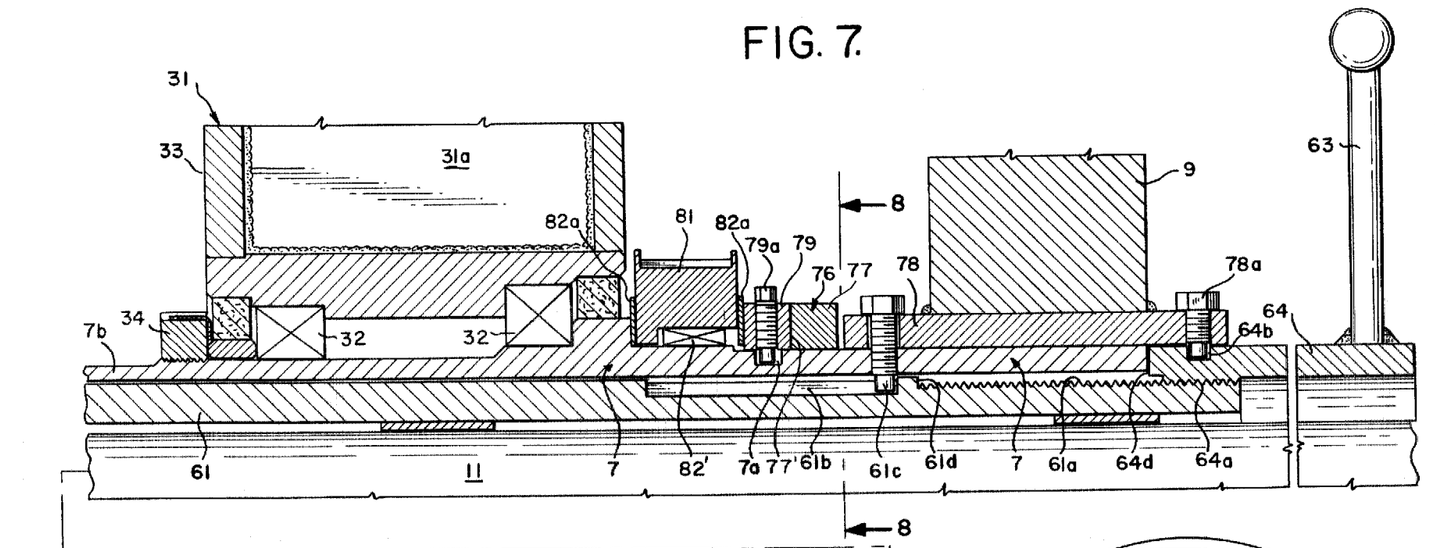
FIG. 7 is a longitudinal, sectional view of the main portion of the tool shown in FIG. 1.
Figure 8:
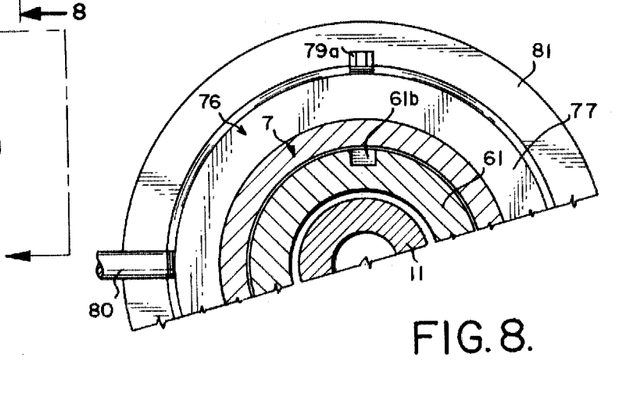
FIG. 8 is a sectional view on line 8—8 of FIG. 7.

When clutch 76 is disengaged, as shown in FIGS. 7 and 8, pulley 81 is free to rotate about main shaft 7 (FIG. 4), therefore, pulley 72 will not rotate shaft 71. When clutch 76 is engaged, as shown in FIG. 1, pulley 81 is locked to and becomes stationary with main shaft 7, and pulley 72 starts rotating its shaft 71 in a planetary mode of operation.

Figures 16, 17, 18:
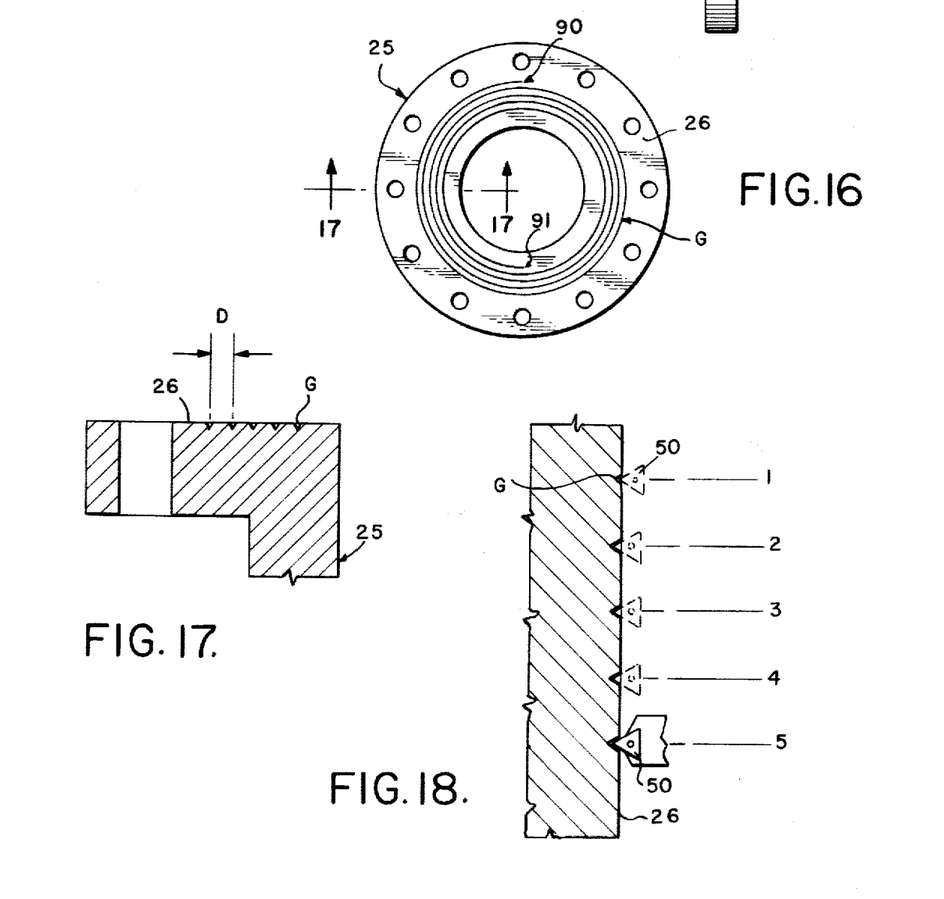
FIG. 16 is a front view of the flange face after the spiral groove has been cut.
FIG. 17 is a partial, sectional view of the flange of FIG. 16.
FIG. 18 is a view showing the progressive positions of the cutting tool as it travels radially inwardly toward the axis of the flange shown in FIG. 16.

The starting position for tool 50 is illustrated as 90 in FIG. 16 and by the dashed line 1 in FIG. 18. Tool 50 will cut a spiral groove cut G across the face 26 of work member 25. Groove G ends at a point 91.

The dashed lines 2, 3, 4 and 5 indicate the starting points of each successive revolution on the groove G cut by the tool 50. Each such revolution is spaced from its adjacent revolution by a radial distance D (FIG. 17).

Figure 19:
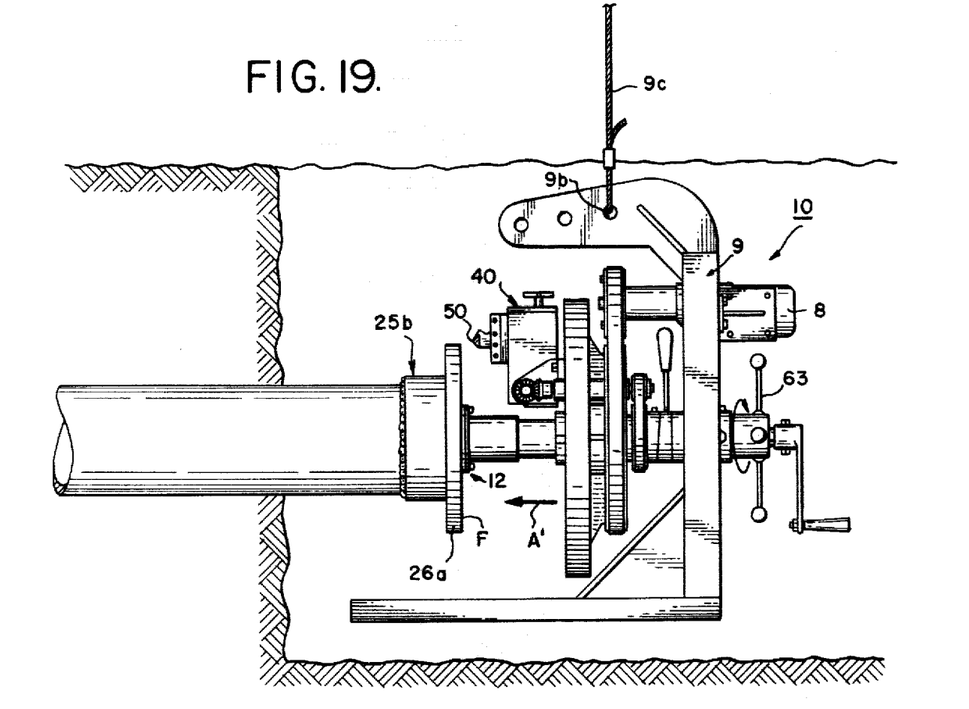
FIG. 19 is a side view in elevation of the tool of the present invention clamped to a pipe in a ditch.
Figure 20:
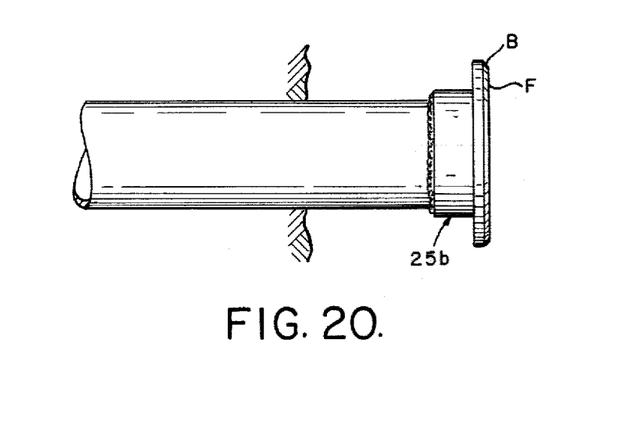
FIG. 20 shows a finished bevel on the flange of the pipe shown in FIG. 19.

The flexibility in the use of the tool 10 in the field is illustrated in connection with FIGS. 19 and 20 wherein it is shown that tool 10 is lowered on a winch cable 9b into a trench for movement in the axial direction A' so that its clamp 12 fits inside the bore of a flanged pipe 25b which is buried in the ground.

The tool 10, when operated as above described, will cut a bevel B on the flange 26a which has a face F parallel to the face plate 33.

In summary of the operation, clamp 12 securely holds tool 10 relative to the inside of work member 25, and face plate 33 rotates the tool holder 49 around the work member 25. Tool holder 49 travels the cutting tool 50 toward the center of face plate 33 when clutches 33 and 76 are engaged.

What is claimed is:

1. A tool comprising:
    a rigid stand having an upright,
    a horizontal main support shaft fixedly mounted on the upright,
    a platform rotatably mounted about said main shaft, said platform having a face plate,
    a first pulley coupled to said platform,
    a traveling tool holder movably mounted on said face plate,
    a transmission drive mechanism for moving said tool holder in a radial direction relative to the center of the face plate, said transmission being driven by a first shaft through a first clutch, the axis of said first shaft being substantially parallel to the face plate,
    a second shaft being rotatably mounted relative to said platform and extending therethrough in a horizontal direction, said first and second shafts being geared to each other,
    a motor mounted on the upright with its shaft extending in a horizontal direction for rotating said platform, and
    a planetary drive mechanism for rotating said second shaft through a second clutch, whereby the rotation of said second shaft is converted into the radial movement of said tool holder.

2. The tool of claim 1, wherein
    said main shaft is hollow,
    a clamp rod coaxially mounted within the main shaft,
    a clamp coupled to said clamp rod, and
    a feed control sleeve concentrically mounted between said clamp rod and said main shaft, said sleeve being attached to said clamp and being movable in a longitudinal direction to bring the clamp toward or away from the face plate.

3. The tool of claim 2, wherein said clamp rod has an outer end carrying oppositely-threaded portions which respectively threadedly engage a pair of discs, and a center bushing disposed between said discs and carrying thereon a guide disc, and said discs having longitudinal slots which are angularly-spaced apart on the outer peripheries of the discs, each set of axially-aligned slots supporting a blade having on its inner sides tapered walls and on its outer sides gripping jaws.

4. The tool of claim 3, wherein said discs and said blades form said clamp, and said clamp being detachably secured to said feed control sleeve.

5. The tool of claim 2, wherein said feed control sleeve is disposed inside the main shaft for axial movement but not rotation relative to the clamp rod, and the inner end of said sleeve being externally threaded, and a mating sleeve threadedly engaging the external thread of said feed control sleeve, whereby the rotation of said mating sleeve causes said feed control sleeve to move axially to thereby move the clamp.

6. The tool of claim 2, wherein, said tool holder is mounted in a tool frame which is pivotably and adjustably mounted on said face plate to any desired angular position of the tool holder relative to the face plate.

7. The tool of claim 1, and a second pulley mounted on said second shaft, a third pulley mounted for rotation about the main shaft, means drivingly coupling said second and third pulleys, means for locking the third pulley to the main shaft through a clutch arrangement comprising a rotatable wedge ring and an adjacent wedge ring, said rings being mounted for rotation about the main shaft and having opposite wedge faces whereby said wedge ring is rotatable to exert an axial force against said adjacent ring, thereby locking said third pulley to the main shaft, and when said third pulley is free to rotate about the main shaft, said second pulley will not rotate said second shaft, and when said third pulley is locked to and becomes stationary with the main shaft, said second pulley starts rotating said second shaft in a planetary mode of operation.

* * * * *